United States Patent [19]
Soós

[11] Patent Number: 6,035,630
[45] Date of Patent: Mar. 14, 2000

[54] INTERNAL COMBUSTION ROTARY ENGINE

[76] Inventor: Sándor Soós, Gyöngyvirág u. 1, Telki, Hungary, H-1024

[21] Appl. No.: 09/000,332
[22] PCT Filed: Jul. 17, 1996
[86] PCT No.: PCT/HU96/00039
  § 371 Date: Jan. 16, 1998
  § 102(e) Date: Jan. 16, 1998
[87] PCT Pub. No.: WO97/04226
  PCT Pub. Date: Feb. 6, 1997

[30] Foreign Application Priority Data

Jul. 17, 1995 [HU] Hungary .................................. 9502145
Jan. 15, 1996 [HU] Hungary .................................. 9502145

[51] Int. Cl.[7] .................................................. F02C 5/02
[52] U.S. Cl. ...................... 60/39.75; 60/39.38; 60/39.76
[58] Field of Search ............................... 60/39.38, 39.75, 60/39.76, 39.78

[56] References Cited

U.S. PATENT DOCUMENTS

| | | | |
|---|---|---|---|
| 547,414 | 10/1895 | Bordman | 60/39.75 |
| 820,838 | 5/1906 | Moss | 60/39.75 |
| 1,174,439 | 3/1916 | Pelley | 60/39.38 |
| 1,200,133 | 10/1916 | Reed | 60/39.75 |
| 1,388,371 | 8/1921 | Pierce | 60/39.75 |
| 2,320,391 | 6/1943 | Wakefield | 60/39.38 |
| 4,365,472 | 12/1982 | Ogata | 60/39.76 |

FOREIGN PATENT DOCUMENTS

| | | | |
|---|---|---|---|
| 425945 | 4/1911 | France | 60/39.76 |

Primary Examiner—Tae Jun Kim
Attorney, Agent, or Firm—Kenyon & Kenyon

[57] ABSTRACT

The internal combustion rotary engine comprises a stator (1) and a rotor (2) that are disposed so that the inner circumference of the stator (1), at least in certain pre-determined circumferential sectors thereof, sealingly surrounds the rotor (2). The stator (1) is provided with at least two combustion chambers. Each combustion chamber has a discharge outlet opening tangentially towards the rotor (2), and at least one fuel inlet (15) through which oxygen or air and fuel, in pre-determined amounts such as to form a combustible mixture, can be injected into the combustion chamber at pre-determined intervals. The rotor (2) has outer ring segments (23) connected to a main shaft (21) by a plurality of spokes (22). The ring segments (23) are provided with a thoroughfare inside (4) through which a continuous stream of ambient air passes through the rotor (2) in axial direction during operation, and a plurality of expansion channels adapted to receive a gas jet of expanding high pressure combustion gases discharged from the combustion chambers through their discharge outlets when inlets of the expansion channels are, temporally and sequentially facing the discharge outlets during the relative rotational movement of the rotor (2) in relation to the stator (1). The rotor (2) consists of at least two adjacent rotor segments (20). The expansion channels in each off the rotor segments (20) form at least one group of thoroughfare expansion channels capable of continuously rotating the rotor (2) by converting the energy content of the combustion gases into driving torque exerted in form of tangential impulses on the ring segment (23). Each expansion channel provides a direct connection for the combustion gases from the discharge outlets of the combustion chambers towards the inside (4) of the rotor segment (20) at intervals when the peripheral inlets of the expansion channels are facing the discharge outlets of the combustion chambers.

20 Claims, 3 Drawing Sheets

INTERNAL COMBUSTION ROTARY ENGINE

This is a 371 of PCT/HU96/00039 Jul. 17, 1999.

TECHNICAL FIELD

The invention relates generally to internal combustion engines, and has particular reference to a rotary engine, especially a rotary engine of the type set forth in the preamble of the attached claim 1.

BACKGROUND ART

One of the tendencies of improving the overall efficiency of traditional volumetric displacement internal combustion engines has been the replacement of the reciprocating pistons of such engines by rotary pistons capable of converting the energy content of the expanding high pressure combustion gases into a direct rotary movement of a driving shaft. The rotary piston engine known as the Wankel engine has been developed furthest in this field, but has not managed to supplant the reciprocating engine due to problems with e.g., sealing materials. Other attempts have been aiming at the development of rotary engines in which a rotor is driven by at least one jet stream of expanding gases which exert a tangential pressure on the circumference of the rotor whereby a part of the energy content of the expanding gas is converted into a driving torque acting on said rotor. Examples of engines of the kind concerned are turbines, especially gas turbines that have found wide-spread application in certain well defined areas. Mainly from literature, designs of internal combustion rotary engines have become known in which a rotor is driven by a continuous series of impulses of expanding combustion gases.

A known prior art device disclosed in U.S. Pat. No. 4,590,761 granted to Zeftner, comprises spaced combustion chambers with recesses therebetween that are arranged around the outer circumference of a rotor. Each recess serves as an expansion chamber for a jet of gas produced by combustion in an associated combustion chamber. A stator has at its inner circumference, retractable reaction members which are movable into the recesses to be acted on by the gas jet so as to create forces acting in opposite sense on the rotor and stator and thus cause the rotor to rotate. This known device seems to be too elaborate since it comprises a large number of cam-controlled movable component parts, and since fuel combustion is performed in open chambers of throttled discharge openings only, the thermal efficiency may also be not sufficiently high for the engine to be viable of practical application.

Another device of the type concerned is disclosed in the published German patent specification DE 1 601 577 A2. The device disclosed herein comprises two equidistantly spaced combustion chambers arranged in a stator along its circumference. Combustion gases generated in these combustion chambers are discharged, at pre-determined intervals into a generally snake-shaped expansion duct which is confined by curved wall partitions of chambers certain parts of which being arranged in both, a rotor of the engine and in said stator. When the engine is supposed to be in operation, said chambers become connected with each other in sequence so that multiple and subsequent expansions of the combustion gaseswould exert alternating active and reactive tangential driving impulses onto the rotor. The expanded combustion gases are finally vented via a duct through the stator in the ambient atmosphere. Considerations given to the disclosed device allow for the conclusion that the device would hardly be capable of practical operation at least in the sense of supplying a driving torque that could be utilised at viable efficiency. The generally snake-shaped expansion duct seems to be too long and too voluminous. In such an expansion duct a permanent counter pressure of substantially constant level may be generated. During the relatively long periods between the successive combustion impulses in the chambers the combustion gases present in said duct may come to a quasi-stagnation. The rate of flow of the gas through said expansion duct is expected to be substantially low because said too long intervals and the relatively large volume of the expansion duct allow for a low velocity, slow release of the expanded combustion gases in the ambient atmosphere. Between the actively and/or reactively driven wall partitions of the rotor chambers long wall sections are present that are, in view of torque generation, at least entirely inactive if not of retroactive effect.

Another example for such an engine is disclosed in the German patent publication DE 1 476 913 A1. The device disclosed herein is, in principle, a multi-stage turbine comprising a rotor provided, in spaced arrangement, with spaced chambers having tangential openings along the circumference of the rotor. When in operation, impulses of a high pressure gas jet are introduced tangentially into said chambers. The impulses exert active and reactive driving forces onto the rotor both upon their entry and also later, during their multi-stage expansion from the chambers. The rotor of the known device is designed and shaped as a hollow cylindrical body having radially directed spokes, and the chambers are arranged in an outer circumferential ring part of the cylindrical body. As an alternative, the same publication discloses the possibility of generating the high pressure gas impulses, at least within the first expansion stage of the turbine, by arranging and operating internal combustion chambers in the rotor. Following the first stage of their expansion, the combustion gases are introduced, via suitable but relatively long conduits, into subsequent stages of the turbine for repeated expansions. Combustion of fuel introduced in the combustion chambers would be performed at constant volume, and the expanding gases would exert, at least during their first stage of expansion, impulses of reactive driving torque on the circumference of the rotor. Due to the relatively long paths of flow for the expanding gases between the subsequent expansion stages and to multiple bends arranged therein, this hybrid solution seems to be hardly efficient enough and thus, capable of replacing the well known reciprocating engines.

The published German patent application DE 3826533 A1 discloses an internal combustion rotary engine having a rotor provided with a plurality of recesses adapted to receive a gas jet of expanding high pressure combustion gases discharged ftom a combustion chamber arranged stationary and in sealed relationship to a pheripheral section of the rotor. When in operation, i.e. the rotor of the engine rotating relative to the combustion chamber, the recesses of the rotor are facing, temporarily and in sequence, the discharge outlet of the combustion chamber. The rotor is kept in continuous rotational motion by the kinetic energy of the jets of the expanding high pressure combustion gases being transferred to the rotor by and during their passage through, and further expansion in the recesses of the rotor. The rotor of the internal combustion rotary engine disclosed in DE 3826533 A1 is designed and shaped as a substantially solid body of rotation, and apart from a brief indication of the heat content of the expanded combustion gases being further utilised by a heat exchanger, no information is disclosed on how the spent combustion gases are released after their expansion.

It is accordingly one object of the present invention to provide an internal combustion rotary engine, especially an engine operating on the principle of a rotary engine driven by a continuous series of tangential impulses exerted onto a rotor by expanding combustion gases of high energy content, the basic design of which would allow for the provision of engines different in size and thus, in performance by using and aligning by simple assembling, different numbers of pre-manufactured, identical component parts. More particularly, the present invention seeks to provide an internal combustion rotary engine that operates with a minimum of losses of energy at high thermal and mechanical efficiency. A further and related object of the present invention is to provide an engine of hitherto not experienced low fuel consumption, the engine being capable of operating with different types of fuel, particularly of liquefied or gaseous hydrogen, in a problem-free manner. Still another object of the invention is to provide a rotary engine that could replace with considerable advantages, the traditional reciprocating internal combustion engines in every field of application. Yet another object of the invention is to provide a method for operating the engine according to the invention in a manner friendly to environment, by producing, if at all, a very low proportion of noxious constituents in its exhaust gases.

It has been recognised that the above and complex objectives can only be realised by providing an engine of the rotary type in which principles and physical effects known, at least in part, such as avoiding reciprocating component parts; using and utilising a rotor of high product of inertia for storing, at least for certain periods of operation, kinetic energy; burning a completely combustible fuel mixture in heat insulated spaces so that adiabatic combustion is performed, allowing and utilising fuel combustion by detonation whereby higher combustion rates and pressures can be achieved, are asserted simultaneously.

DISCLOSURE OF THE INVENTION

According to the present invention there is provided an internal combustion rotary engine comprising a circular inner element mounted to be rotatable thereby to function as a rotor of the engine and a concentric, substantially annular outer element mounted to be stationary thereby to function as a stator of the engine. The rotor and the stator are disposed so that the inner circumference of the stator, at least in certain pre-determined circumferential sectors thereof, sealingly surrounds the rotor. The rotor and the stator are mounted for relative rotation about the axis of concentricity thereof. The stator is provided with at least two combustion chambers equidistantly spaced around said circumference, each of the combustion chambers have a discharge outlet opening tangentially into said circumference towards the rotor. Each of the combustion chambers further has at least one fuel inlet through which oxygen or air and fuel, in pre-determined amounts such as to form a combustible mixture, can be injected into the combustion chamber at pre-determined intervals. The combustion chamber further comprises means for initiating or enhancing the ignition of the combustible mixture injected into said combustion chamber. The rotor is designed so as to form a generally ring-shaped body of rotation having an outer ring body connected to a central shaft by a plurality of spokes in a rigid, torque transmitting manner. Said central shaft protrudes, at least at one of its end portions, from the ring body, and is mounted to serve as the main shaft of the engine. The ring body is provided with a plurality of recesses adapted to receive a gas jet of expanding high pressure combustion gases discharged from the combustion chambers through their discharge outlets when the recesses are, temporally and sequentially facing said discharge outlets during the relative rotational movement of the rotor in relation to the stator. According to one of the novel characteristic features of the invention the rotor consists of at least two rotor segments that comprise a ring segment having a thoroughfare inside through which a continuous stream of gas such as ambient air passes through the rotor in one axial direction during operation. The recesses in the rotor segments are designed and shaped so as to form at least one group of thoroughfare expansion channels capable of continuously rotating the rotor by converting the energy content of the combustion gases into driving torque exerted in form of impulses acting tangentially on the ring segments of the rotor. Another novel feature of the invention lies in that each of the expansion channels provide a direct connection for the combustion gases from said discharge outlets of the combustion chambers towards the inside of the rotor segments at intervals when inlets of the expansion channels along the outer circumferences of the rotor segments are facing said discharge outlets along the inner circumference of the stator.

BRIEF DESCRIPTION OF DRAWINGS

Other features and advantages of the invention will be apparent from the following description of preferred embodiments, by way of example only, with reference to the accompanying drawings, in which.

BEST MODE FOR CARRYING OUT THE INVENTION

Figure 1:
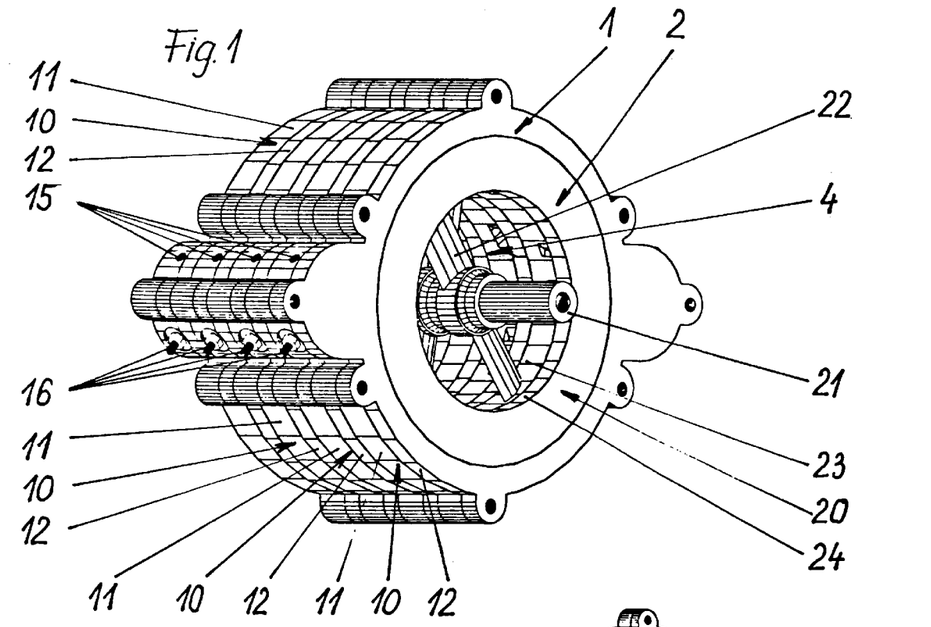
FIG. 1 is a perspective view of a rotary engine embodying the invention and consisting of four identical segments in which each stator segment comprises two combustion chambers.
Figures 2, 3:
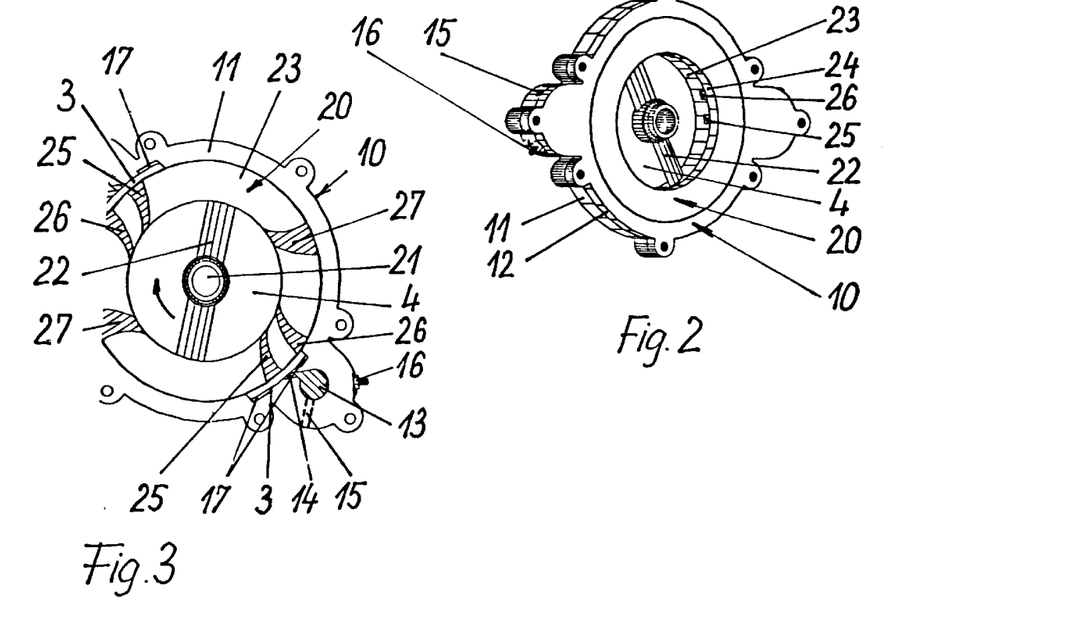
FIG. 2 is a perspective view of one of the segments of the rotary engine shown in FIG. 1.
FIG. 3 is a partial top view of the segment shown in FIG. 2 wherein a segment lid of the stator segment and a cover disk of the rotor segment are removed to expose one of the combustion chambers and one group of the expansion channels of the engine segment.
Figure 4:
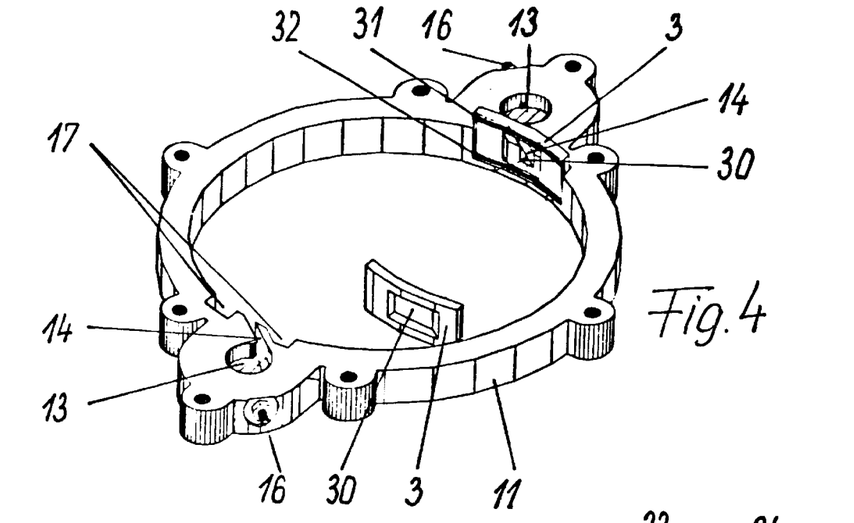
FIG. 4 shows a perspective view of the segment body of the stator segment of the engine revealing also arcuate seal members together with their locations and seatings.

In the preferred embodiments shown, by way of example only, in FIGS. 1 to 9 of the accompanying drawing, the internal combustion rotary engine embodying the invention has a stator 1 and a rotor 2 consisting respectively, of four identically shaped stator segments 10 and four identically shaped rotor segments 20. The segments are aligned co-axially along a main shaft 21. Each of the stator segments 1 comprises a segment body 11 a side face of which is sealingly covered by a segment lid 12. Each rotor segment 20 consists of a ring segment 23 and a cover disk 24. The cover disk 24 is in diameter equal with and sealingly mounted onto one side face of the ring segment 23. The rotor 2 is designed so that it forms a generally ring-shaped body of rotation having a relatively high product of inertia. To ensure this, the ring body consisting of four ring segments 23 and four cover discs 24 is connected to the main shaft 21 by a plurality of spokes 22 in a rigid, torque transmitting manner. The main shaft protrudes at both of its end portions from the rotor 2 and serves as the main shaft 21 of the engine. In accordance with one of the important novel characteristic features of the invention the rotor 2 has a thoroughfare inside 4 through which a continuous stream of ambient air can pass through the rotor 2 in axial direction during operation. FIG. 2 shows the perspective view of one engine segment that would be, in itself alone, capable of working in certain low power ranges. Since throughout the drawings, identical component parts of the engine have been assigned the same reference numerals, there seems to be no need for a repeated detailed description of the engine segment depicted in FIG. 2. As shown in FIGS. 3 and 4, each segment body 11 is provided with two combustion chambers 13 spaced equidistantly around and radially from the inner circumference of the stator 1. Each combustion chamber 13 has a discharge outlet 14 and a fuel inlet 15. Besides fuel such as e.g. liquid hydrogen, also compressed air or oxygen and if desired, water can be injected through the fuel inlet 15, in controlled amounts and at pre-determined intervals, into the combustion chamber 13. As further shown in FIGS. 3, 4 and 7, each segment body 11 of the stator further comprises seatings 17 for housing an arcuate seal member 3, and a bore for a spark plug 16 for each combustion chamber 13, while the ring segments 23 of each rotor segment 20 comprises, for each combustion chamber 13, a group of three successive expansion channels 25, 26 and 27 as it is apparent from the drawing FIGS. 3, and 5 to 7. In order to ensure adequate provisions for adiabatic combustion, the engine has heat insulated, preferably heat resistant ceramic-lined combustion chambers 13, discharge outlets 14 and expansion channels 25, 26, 27, and the rotor segments 20 of the rotor 2 are, along their outer circumference, similarly heat insulated, preferably heat resistant ceramic-lined component parts of the engine. The inner circumference of the stator segments 10 is, in circumferential sectors where the discharge outlets 14 of the combustion chambers 13 open tangentially into said circumference towards the rotor 2, provided with sealing means for a sealed but still rotatable engagement between the stator segment 10 and the rotor 2 in said circumferential sectors thereof. As sealing means arcuate seal members 3 are provided for that are inserted against the action of pre-stressed spring means (not shown in the drawing figures) in suitable seatings 17 recessed into the inner circumference of the stator segments 10. Each arcuate seal member 3 has a thoroughfare opening 30 whereby a free flow of the high pressure combustion gases from the discharge outlets 14 of the combustion chambers 13 towards the rotor 2 and into the expansion channels 25, 26 and 27 is allowed for at intervals when the inlets of said expansion channels 25, 26 and 27 along the outer circumference of the corresponding rotor segment 20 are facing said discharge outlets 14 along the inner circumference of the stator 1. The arcuate seal members 3 are interchangeable wear parts made of a suitable coal material. Each arcuate seal member 3 is provided with two seal ribs 31, 32 of circular segment-shaped cross section. The seal ribs 31, 32 protrude along parallel lines both sides of the opening 30 from the arcuate inner circumference of the seal member 3, and they are in matching engagement with and thus, form gas-proof seals against annular sliding and sealing surfaces 28, 29 of the rotor 2 along the preferably ceramic-lined outer circumference of the corresponding rotor segment 20. Such a design of the peripheral sealing means allows for the engine to be lubricated simply by water. Each combustion chamber 13 of the engine shown in the drawing has a volume of around 8 cm$^3$ at a depth of 1 cm. The discharge outlets have a nominal cross section of 0.5×1 cm, and they are shaped as Laval nozzles known per se. The fuel inlets are arranged at a location so that they provide for a rapid mixing and a complete combustion of the fuel after injection. The timed feeding of high pressure air or oxygen, of fuel (preferably hydrogen) and optionally of water into the combustion chambers 13 through the fuel inlets 15 is performed and controlled preferably by means of plain slide valves known again, per se. The nominal radius of the common circumference of rotation between the stator 1 and the rotor 2 is 12 cm. The stator segments 10 and the rotor segments 20 are of 4 cm thickness, each. The segment body 11 has a thickness of 2.5 cm, and the thickness of the segment lid 12 amounts to 1.5 cm. Similarly, the ring segment 23 has a thickness of 2.5 cm and the cover disk 24 is 1.5 cm in thickness. The radius of the inside 4 in the rotor 2 is 8 cm. As it is apparent from the drawing, the stator segments 10 of the stator 1 can be very easily aligned and they are held together by threaded rods (not shown) arranged around the outer periphery of the stator 1 in axial direction. With the dimensions indicated further above, the largest "diameter" of the rotor segments (measured along a line through the central points of the two opposite combustion chambers 13) amounts to 43.2 cm while the outer "diameter" of the preferably light metal segment body 11 and segment lid 12 is 32 cm. Each engine segment weighs (without the main shaft 21) around 8.7 to 8.8 kgs so that the total weight of a four segment engine comprising sixteen combustion chambers 13 in total, amounts (without a main shaft 21 of the lengths of 30 cm again) to app. 35 kgs.

FIGS. 3 and 5 to 7 of the drawing show clearly that the rotor segments 20 of the rotor 2 comprise two groups of expansion channels 25, 26 and 27. The inlets of the expansion channels 25, 26 and 27 of each group are arranged in pre-determined spaced relations to each other along the outer circumference of the rotor segment 20. The expansion channels 25, 26, 27 are channels of narrowing cross-section towards the inside 4 of the rotor 2 and they are recessed into one side face of the ring segment 23. The expansion channels 25, 26, 27 have, when viewed in the direction of rotation, forward and rearward confining wall sections, and both their forward and rearward wall sections are shaped, starting from their inlets along the outer circumference of the rotor 2, as turbine blade-like arcuate wall sections. In other preferred embodiments of the rotary engine embodying the invention the expansion channels may be different. In one alternative design shown (without main shaft 21 and spokes 22) in FIG. 8 of the attached drawing, a ring segment 23' has a side face provided with an axially protruding annular rim at its outer circumference, and a cover disk 24 that is again, in diameter equal with and mounted onto said rimmed side face of the ring segment 23'. In this alternative embodiment, each group of channels consists of two expansion channels 25', 26' that are designed and shaped as thoroughfare channels arranged in the ring segment 23' in a manner that they start, when viewed in the direction of rotation, in tangentially forward direction from their inlets along the outer circumference of the ring segment 23', curve rearwardly and in sideward direction, and open into said rimmed side face of the ring segment 23'. From here, the expansion channels 25' and 26' are in direct connection with the inside 4 of the rotor 2 since the rimmed side face of the ring segment 23' provides for an annular hollow space between the rimless inner circular portion of said side face and the cover disk 24 that is open, in radial directions, towards the inside 4 of the rotor 2.

Figure 5:
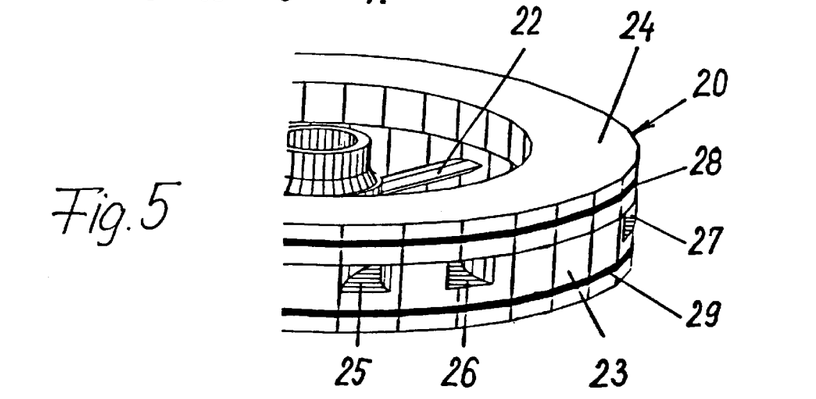
FIG. 5 depicts a partial elevation of one of the rotor segments of the engine.
Figure 6:
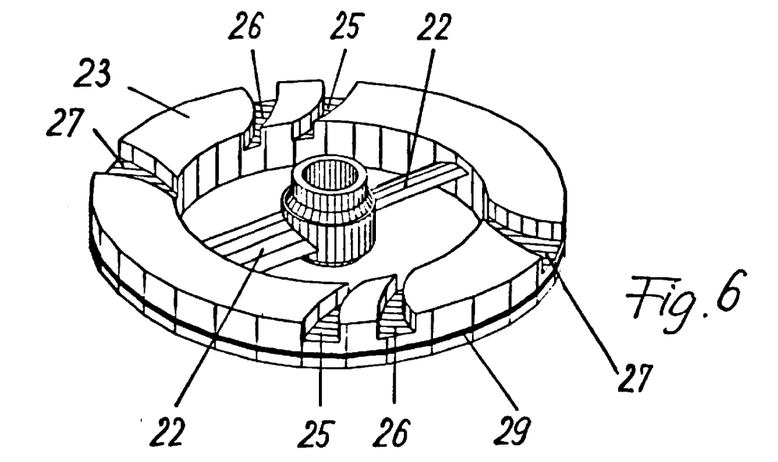
FIG. 6 is an elevated perspective view of a ring segment of the rotor segment shown in FIG. 5.
Figure 7:
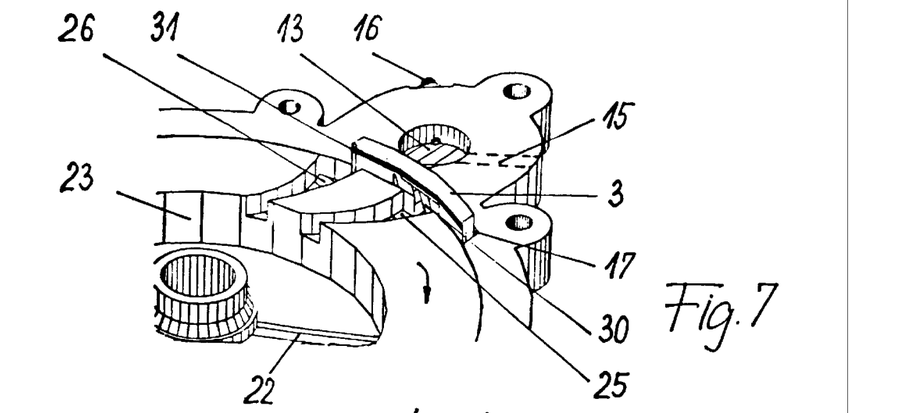
FIG. 7 is an elevated partial perspective view of a portion of one segment of the rotary engine with the segment lid and the cover disk removed again to reveal details of the construction of the combustion chamber and the arcuate seal member associated therewith.
Figure 8:
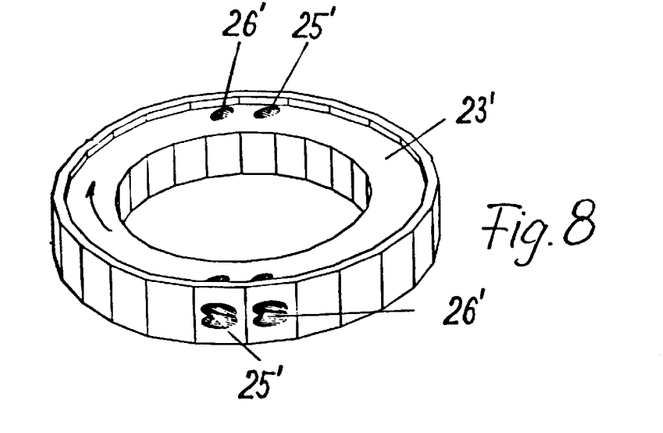
FIG. 8 is a view similar to FIG. 6 but showing the ring segment of a modified embodiment of the rotor segment of the rotary engine.

FIGS. 4 and 5 of the drawing show the preferred design and construction of the arcuate seal members 3. It is apparent from the drawing figures that their seatings 17 are recessed in the inner circumferences of both the segment body 11 and the segment lid 12 of the stator segment 10. The seatings 17 are of a radial depth so that the arcuate seal members 3 can be withdrawn radially against the action of the pre-stressed spring means (not shown but already mentioned further above) when and during the rotor 2 is inserted into the stator 1, or removed therefrom in axial direction. The drawing figures show further that one of the two seal ribs 31, 32 of circular segment-shaped cross section protruding both sides of the opening 30 along parallel lines from the arcuate inner circumference of the arcuate seal member 3, namely the seal rib 32 is engages with and thus, provides for a gas-tight seal against an annular sliding and sealing surface 29 along the preferably ceramic-lined outer circumference of the ring segment 23 of the rotor segment 20. In the same manner, the seal rib 31 corresponds and provides for a gas-tight seal with the annular sealing surface 28 of the preferably ceramic-lined cover disc 24 of the rotor segment 20. The openings 30 of the arcuate seal members 3 are shaped wide enough so that the expanding combustion gases of the temperature between 1500 and 1600° K. (even if additional water is injected into the combustion chambers 13 after each complete combustion but before expansion) will not contact the arcuate seal members 3 directly upon their expansions through the discharge outlets 14. On the other hand, the peripheral lengths of the arcuate seal members 3 ensures that each seal member 3 is capable of simultaneously and sealingly closing the inlets of both expansion channels 25 and 26 of the same group of channels when they are just in facing relation to said seal member 3 during operation.

From the point of view of operation that will be described in detail further below, an important characteristic feature of the invention lies in that the rotor 2 of the engine is open at its both end portions and thus, has a thoroughfare inside 4 through which a continuous stream of ambient air can pass through the rotor 2 in axial direction, during operation. This is well enhanced by the provision of the torque transmitting connection between the annular ring segments 23 or 23' and the main shaft 21 of the rotor 2 via spokes 22. According to a further feature of the invention at least some spokes 22 of the rotor 2 are designed and shaped so as to serve, in operation, as axial fan blades for generating and maintaining a space of somewhat (preferably by 5 to 20 kPa) lower pressure in, and an axial flow of ambient air for scavenging the rests of expanded combustion gases from the expansion channels 25, 26, 27; 25', 26' and cooling the rotor 2, through the inside 4. Said inside 4 can also be equipped, at one of its end portions, with an inlet chamber (not shown) having a suction filter, and with another chamber at its other end portion for temporary collecting the expanded combustion gases prior their release in the ambient atmosphere.

For its effective, normal operation, the rotary engine according to the present invention as shown in the attached drawings and described above, will have to be associated with well known auxiliary devices such as a starter whereby the main shaft 21 is brought in rotation before and through initial ignition; a break which can preferably be a disc break working also in association with the main shaft 21; a preferably electronic injecting device capable of controlled injecting oxygen (or high pressure air), fuel, preferably hydrogen and as a preferred option, also pre-determined amounts of water, in a controlled manner into the engine's combustion chambers 13; yet another, preferably electronic device for effecting the controlled ignition of the injected fuel mixture in the combustion chambers 13 by spark plugs 16; and a suitable gear box, preferably of the electronically controlled automatic kind known, in various embodiments thereof in the field of automotive vehicles. Parameters and functions of the engine, together with those of its auxiliary devices mentioned above, are in most preferred, up to date embodiments of the invention, integrally controlled by an electronic board computer.

In the following, best and alternative modes of operating the preferred embodiment of the rotary engine, together with certain characteristic data thereof will be described in a more detailed manner.

In accordance with the general characteristic features of one best mode method according to the invention, the engine is operated by injecting intermittently, in amounts depending on the prevailing actual engine performance requirements and at pre-determined sequential intervals controlled in accordance with the number of groups of expansion channels 25, 26, 27 or 25', 26' in, their spaced relationship along the circumference, and the actual speed of revolution of the rotor 2, oxygen or air and fuel that would form a fuel mixture capable of complete combustion in the combustion chambers 13; causing the fuel mixture, by controlled ignition or spontaneously to burning, preferably by detonation, at constant volume by keeping said combustion chambers 13 gas-tightly sealed until the peak combustion pressure therein is reached; expanding the high pressure combustion gases, preferably in three or at least two expansion steps in sequence, in the form of impulses of gas jets directed tangentially, via the discharge outlets 14 of the combustion chambers 13 into the expansion channels 25, 26, 27 or 25', 26' by bringing, through the rotation of the rotor 2 relative to the stator 1, the circumferential inlet openings of the expansion channels 25, 26, 27 or 25', 26' in temporary facing relationship with the discharge outlets 14 of the combustion chambers 13; and by removing the expanded combustion gases from the expansion channels 25, 26, 27 or 25', 26' through the hollow inside 4 of lower pressure of the rotor 2. During operation, after the combustion preferably by detonation has been concluded in a combustion chamber 13, and an (in the direction of rotation) first expansion channel 25 arrives at its circumferential position facing the discharge outlet 14 of the combustion chamber 13 concerned, the combustion gases of still maximum pressure and temperature are discharged, in the form of a tangential hot gas jet in the first expansion channel 25, and they exert, while expanding, a considerable impulse of pressure and thus a pushing impulse against the arcuate, forward wall portion of said channel. The arcuate forward wall portion of the expansion channel 25 (similarly to those of the succeeding expansion channels 26 and 27) is shaped such that the particles of gas that have been trying to maintain their direction of motion are forced to continuously alter their path of movement, nearly until an angle of turn of slightly less than 180° is performed while they move towards the inside 4 of the rotor 2. During their travel, the gas particles continuously transfer and thus, gradually loose their energy content while they slow down, simultaneously. Since, however, the gas particles are acting against wall portions rotating at constant angular velocity but of gradually smaller radius and thus, of diminishing velocity of advance, a long lasting, continuous energy transfer is performed along their entire path of travel because the wall portions transforming pressure into force and thus, into driving torque would not "escape" from the impacts of particles of the expanding gas. The peripheral length of the arcuate seal members 3 and the peripheral distance between the inlets of the successive expansion channels 25 and 26 have been selected so that the arcuate seal member 3 will simultaneously cover the peripheral inlets of both expansion channels 25 and 26 whereby the (remaining) pressure in the combustion chamber 13 is maintained until the inlet of the expansion channel 26 arrives in its position facing the discharge outlet 14. In this position, a second gas jet impulse generated by and carrying a "second stage" energy content of the remaining combustion gases is discharged into the expansion channel 26, and it will be utilised therein, for driving torque generation in the same manner as described further above. In rotor segments 20 having a ring segment 23 with three successive expansion channels 25, 26 and 27, energy transfer is performed even in the last expansion channel 27 the main task of which is to ensure that even low pressure rests of the combustion gases are removed from the combustion chamber 13. This is further enhanced by the lower pressure and the axial flow of ambient air maintained, for scavenging the rests of expanded combustion gases from the expansion channels 25, 26, 27 or 25', 26', and cooling the rotor 2, in and through the inside 4 of the latter.

In order to achieve its main goals and best performance, the rotary engine embodying the invention is operated by using liquefied hydrogen with oxygen added thereto in amounts capable of fully oxidising the hydrogen injected into the combustion chambers 13. For starting, first the rotor 2 is set in rotational motion by using any known starter device as referred to further above. The minimum speed of revolution required for starting does not need to be higher than 60 to 80 r.p.m. which is in range of that of the traditional reciprocating engines. Since however, the rotor 2 of the rotary engine according to the invention is freely rotatable (with no resistance that would result from compression), starting speeds in the order of 600 r.p.m. can be easily realised by using a starter of conventional performance. Having reached the desired speed of revolution, the engine is started by injecting oxygen, followed by hydrogen through the fuel inlets 15 in the combustion chambers 13 and by initiating combustion of the fuel mixture by means of the spark plugs 16. All these phases of operation are controlled electronically by a suitable board computer. In this starting phase of operation combustion will not be performed under adiabatic conditions as long as the engine is heated up to working temperature. Having arrived at this temperature, it is no longer necessary for the spark plugs 16 to be kept in operation since the high temperature of the insulated, ceramic-lined combustion chamber walls 13 alone causes the fuel mixture to spontaneous combustion by detonation. The optimum speed of revolution of the main shaft 21 may be in the order of 4000 r.p.m. In certain fields of application however, higher values reaching even 6000 r.p.m., and also much slower speed values are possible. The speed of revolution of the main shaft 21 is maintained at its optimum value by the board computer. Both, overspeed and much to low speed values of rotation caused by varying load conditions and other factors are corrected automatically. For cutting off the engine's operation, i.e. for stopping the rotating motion of the main shaft 21 and for adding controlled braking effect to the engine brake function in non-load and among others, in possible emergency modes of operation if required, the use of at least one disc brake device, acting on the main shaft 21, is recommended. An ultimate requirement of operation is that combustion of the fuel mixture is performed at constant volume with the combustion chambers being gas-tightly sealed throughout the entire, complete combustion. To meet with this requirement, besides providing a suitable shape and maintaining the gas-tight sealing effect of the arcuate seal members 3, the fuel injection (and ignition) have to be controlled in a manner that the combustion by detonation in a closed space which, in contrast to traditional reciprocating engines, is highly desirable with the rotary engine according to the present invention, is completely concluded in the combustion chambers 13 by the time the inlet of the first expansion channel 25 reaches its phase of rotation facing the discharge outlet 14 of the respective combustion chamber 13. Fulfilling the above requirement results in that the expansion of the combustion gases and thus, the transfer of energy will start always at times and intervals where maximum pressure prevails. With one of the preferred embodiments of the engine as shown and described above, the combustion gases are allowed to expand from each combustion chamber 13 in three successive steps (or pressure stages). The first step of their expansion starts with the inlets of the first expansion channels 25 reaching at and facing the discharge outlet 14 of a combustion chamber 13 in which combustion gas, in fact pure vapour of water, has been generated by completely burning a suitable dose of a mixture of hydrogen and oxygen by reaching peak temperatures in the range of 2500 to 2600° K., and a peak pressure of between 8 and 16 MPa. This first step of expansion is followed by a second one through the expansion channel(s) 26, and a third one through channels 27 (if any), resulting in full conversion of the energy content into driving torque, and in the entire amount of expanded combustion gas being removed from the respective combustion chambers 13 that are ready now to receive a successive fuel charge by controlled injection. Each of the expansion channels 25, 26, 27 has an effective wall portion of about 5 $cm^2$ on which pressure impulses are exerted upon each expansion. The average value of the radii of pressure impacts amounts to 10 cm which is equivalent to an average diameter and thus, to a torque generating arm of couple of 20 cm. Average pressure values of the successive expansion stages are estimated to be in ranges of 11 to 9 MPa, 8 to 5 MPa and 4 to 0.1 MPa, respectively. Practical realisation of the higher values is highly probable since the initial high pressure of the gas emerging from the combustion chamber always acts at wall the portions of maximum radius. The main shaft 21 rotates at 4000 r.p.m. at maximum performance of the engine. Since peak temperatures lying between 2500 and 2600° K. when the engine is operated by hydrogen would result in an extraordinary high thermal load even for heat insulating linings known from up-to-date techniques, according to one of the provisions of the present invention, pure water is injected in the combustion chambers 13 soon after combustion is concluded but before expansion. By doing so, the combustion gases cool down to a temperature between 1500 and 1600° K., while their pressure will also decrease accordingly. Since however, by the additional injection of water the amount of gas, i.e. vapour contained in the chamber is increased substantially, the energy content of the chamber seems to remain practically unchanged. Injecting water into the combustion chamber can be applied, with good results, even if the engine is operated by using fuel other than hydrogen. e.g. petrol, diesel, LP gas etc. The controlled injection of water can be performed either by using the fuel inlets 15 of the combustion chambers for this purpose, or through separate, additional inlets serving to water injection only.

In the preferred embodiment of the invention where each engine segment comprises two combustion chambers 13 and two groups of expansion channels having three expansion channels 25,26 and 27 each, four combustions per segment, and in accordance herewith, four times three i.e. twelve expansion stages per segment are performed during each full revolution of the main shaft 21. When in full operation, in the four segment engine shown in FIG. 1 of the drawings the rotor 2 is driven by forty-eight expansion impulses per revolution. By using the above mentioned, partly estimated data, the product of inertia of the rotor, the driving torque and the estimated output of the main shaft 21 can be calculated with substantial ease. Estimations in this direction have shown that the fuel consumption of the engine according to the present invention would be around one sixth to one eighth of that of an average traditional reciprocating engine of the same power output. Thank to this and other features such as burning fuel by detonation being not only allowed but desirable, the use of so called hydrid fuel tanks, or the safe storage of hydrogen in steel flasks both, in liquid form at atmospheric pressure, or in its compressed gaseous state under a pressure of 25 bar would become entirely safe and applicable even for and in ordinary motor cars.

Figure 9:
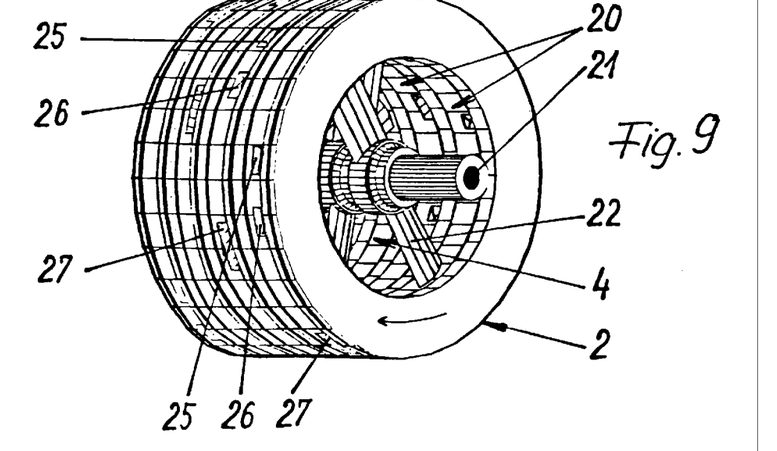
FIG. 9 the perspective elevation of an alternative embodiment of the rotor of a four-segment rotary engine embodying the invention.

For ensuring a substantially uniform, even distribution of the driving torques exerted by the expansion impulses on the rotor 2, embodiments of the latter as shown in FIG. 9 of the attached drawing seem to be especially advantageous. In the embodiment of FIG. 9 the identically shaped rotor segments 20 are aligned co-axially along the main shaft 21 in a manner so that the groups of expansion channels 25, 26 and 27 of each rotor segment 20 are arranged in equidistantly phase-shifted relation to those of the juxtaposed rotor segments 20 around the main shaft 21.

Full operation of the engine means that the entire output power capacity of the engine is needed and thus, all combustion chambers 13 are working at full performance. Such a full load mode of operation is rarely needed. More characteristic modes are partial load and no-load modes of operation. There are a number of possibilities for varying the output power of the engine. Some of these possibilities can also be applied in combination. The simplest way of power control would be the altering of the amounts of fuel injected in the combustion chambers. The engine according to the present invention however, offers a more advantageous, hitherto not exercised possibility for output power control by suspending, especially in partial load and no-load run modes of operation, the injecting of fuel and optionally, of air or oxygen into at least some of the combustion chambers 13. Cutting off the chamber's work may be performed individually, in certain groups, segment-wise, or even in more segments of the engine. The rotor 2 having a relatively high product of inertia, is capable of storing a considerable amount of kinetic energy. As a result of this, in certain, especially no-load modes of operation where only frictional and possibly other losses need to be covered, in a four segment engine as shown in the drawing and described above, operating only one single segment may be sufficient. In order to maintain a substantially equal distribution of thermal load and wear over the combustion chambers 13 of the engine, sequentially controlled switch-overs between the working and temporary suspended combustion chambers 13, preferably by segments, can be performed with substantial advantage. As another provision aiming at savings in energy consumption, the speed of rotation of the rotor 2 is maintained between values of e.g. 3000 and 4000 r.p.m. even in no-load modes of operation. When said speed reaches or approaches the lower limit value, the board computer puts at least individual combustion chambers into operation. In engine break modes of operation again, the braking energy is used for speeding up the rotor, and for avoiding an overspeed, either the disc brake mentioned already further above is activated, or an additional, fifth engine segment mounted for and operated in opposite sense of rotation may be applied.

Reference has already been made to the possibility of operating the engine according to the present invention by using fuel other than hydrogen. In fact, all known kinds of fuel suitable for combustion are applicable for effective operation. Through the inlet openings 15 e.g. compressed air and ordinary petrol can be injected in a controlled manner, in the combustion chambers 13. For performing the injection, devices should be used that would be suitable for temporary suspending the injection of at least the fuel component of the fuel mixture in individual combustion chambers 13 or in certain groups thereof. As a further auxiliary device, the engine needs an air compressor capable of compressing 5 to 6 of atmospheric air to a pressure between 2 to 6 MPa in continuous mode of operation. The compressor has to be associated with a pressure vessel of sufficient volume capable of storing an amount of high pressure air that would be needed for re-starting the engine. The air consumption of the engine in full load operation at 4000 r.p.m. is estimated to 3.2 to 3.8 $m^3$ of atmospheric air with an air ratio amounting to values between 0.9 and 1.1. This is much less than the air consumption of a 2000 to 2500 $cm^3$ traditional engine of app. the same output power. For the controlled air and fuel injection also here, the use of solenoid controlled plain slide valves is recommended. The air ratio may preferably be controlled by altering the amount of the air charge injected, and before concluding the expansion in its preferably third stage, the respective expansion channels should be flushed by small amounts of fresh air injected therethrough.

Certain losses are inevitably associated even with the rotary engine according to the invention. Friction losses occur in the preferably slide bearings of the main shaft 21. Further friction losses arise between the arcuate seal members 3 and the circumference of the rotor 2. A possibility of reducing the latter lies in the provision of retracting arcuate seal members 3 associated with temporary non-working i.e. suspended combustion chambers, against the action of their pre-stressed spring means in their respective seatings 17. In no-load mode of operation of the engine all arcuate seal members 3 could be retracted. Ventilation losses are caused by the spokes 22. These can be reduced by using spokes in reduced number and of smaller surface areas. In more sophisticated embodiments even spokes 22 of controllable blade angle could be foreseen.

Industrial Applicability

Among the numerous advantages provided by the present invention seems to be worth emphasising that thank to combustion performed under adiabatic conditions in the engine, a thermal efficiency that would come very close to that of the ideal Carnot process is realised. A further advantage is produced by the possibility of not only allowing but of positively performing combustion by detonation. The possibility of operating the combustion chambers individually or in certain groups thereof provides further advantages especially with respect of output power control. By storing kinetic energy in the rotor temporarily, these advantages are further enhanced. Besides the possibility of operating the engine by using any known combustible fuel, the preferred use of hydrogen for engine operation results in outstanding values of thermal efficiency and in the fact the engine being totally friendly to environment.

The rotary engine embodying the invention consists of a surprisingly few number of component parts. Most of them are standard parts, easy to manufacture, and they are used in multiple applications. Space requirement of the engine is very low, the engine is of relatively low mass when compared with conventional engines of equal performance. The engine can be operated under every possible condition, i.e. in motor vehicles, motor boats, aircrafts etc. It can even be built in into wheels of automotive vehicles if adequate transmission gears are used thereto. Since because of other advantages associated therewith and referred to further above, the rotor has a relatively high product of inertia, especially in vehicles, the use of friction clutches having a higher than usual number of friction discs, together with the use of transmission gears of the multiplicator kind is highly recommended.

List of Reference Signs Used in the Drawings

| | |
|---|---|
| stator | 1 |
| stator segment | 10 |
| segment body | 11 |
| segment lid | 12 |
| combustion chamber | 13 |
| discharge outlet | 14 |
| fuel inlet | 15 |
| spark plug | 16 |
| seating | 17 |
| rotor | 2 |
| rotor segment | 20 |
| main shaft | 21 |
| spoke | 22 |
| ring segment | 23, 23' |
| cover disc | 24 |
| expansion channel | 25, 26, 27 |
| expansion channel | 25', 26' |
| sealing surface | 28, 29 |
| arcuate seal member | 3 |
| opening | 30 |
| seal rib | 31, 32 |
| inside | 4 |

I claim:

1. An internal combustion rotary engine comprising a circular inner element mounted to be rotatable thereby to function as a rotor of the engine and a concentric, substantially annular outer element mounted to be stationary thereby to function as a stator of the engine, said rotor and stator being disposed so that an inner circumference of the stator, at least in certain pre-determined circumferential sectors thereof, sealingly surrounds said rotor, said rotor and stator being mounted for relative rotation about an axis of concentricity thereof, the stator being provided with at least two combustion chambers equidistantly spaced around said circumference, each of said combustion chambers having a discharge outlet opening tangentially into said circumference towards said rotor, each of said combustion chambers further having at least one fuel inlet through which oxygen or air and fuel, in pre-determined amounts such as to form a combustible mixture, can be injected into said combustion chamber at pre-determined intervals, the combustion chamber further comprising means for initiating or enhancing the ignition of the combustible mixture injected into said combustion chamber, said rotor being designed so as to form a generally ring-shaped body of rotation having a thoroughfare inside extending axially therethrough, and an outer ring body connected to a central shaft by a plurality of spokes in a rigid, torque transmitting manner, said central shaft protruding, at least at one of its end portions, from said ring body and being mounted to serve as the main shaft of the engine, said ring body of the rotor being provided with a plurality of recesses adapted to receive a gas jet of expanding high pressure combustion gases discharged from said combustion chambers through their discharge outlets when said recesses are, temporally and sequentially facing said discharge outlets during the relative rotation of said rotor in relation to said stator, the rotary engine being characterised in said rotor consisting of at least two adjacent and identical rotor segments, comprising each, a ring segment, and said recesses being, in each ring segment of said rotor, designed and shaped so as to form at least one group of thoroughfare expansion channels providing direct connections for the combustion gases from said discharge outlets of said combustion chambers towards said inside of said rotor at intervals when inlets of said expansion channels along the outer circumference of said rotor segments are facing said discharge outlets along the inner circumference of the stator.

2. The internal combustion rotary engine as claimed in claim 1, wherein each rotor segment of said rotor comprises at least one group of expansion channels, and the inlets of the expansion channels forming said group(s) are arranged in pre-determined spaced relations to each other along the outer circumferences of said rotor segments.

3. The internal combustion rotary engine as claimed in claim 2, wherein each rotor segment consists of a ring segment having a side face provided with an axially protruding annular rim at its outer circumference, and a cover disk, said cover disk being in diameter equal with and mounted onto said side face of said ring segment, and said expansion channels being thoroughfare channels arranged in said ring segment, the expansion channels starting, when viewed in the direction of rotation, in tangentially forward direction from their inlets along the outer circumference of said ring segment, curving both, rearwardly and in sideward direction, and opening into said rimmed side face of the ring segment, from where said expansion channels are in direct connection with said inside of the rotor.

4. The internal combustion rotary engine as claimed in claim 2, wherein said engine has heat-insulated, heat-resistant ceramic-lined combustion chambers, discharge outlets and expansion channels, and said rotor segments of said rotor are, at least along their outer circumferences, similarly heat-resistant and heat-insulating ceramic-lined component parts of the engine.

5. The internal combustion rotary engine as claimed in claim 2, wherein said stator of the engine comprising at least two stator segments, the inner circumferences of which are in circumferential sectors where the discharge outlets of said combustion chambers open tangentially into said circumference towards the rotor, provided with sealing means for a sealed but still rotatable engagement between said stator segments and said rotor in said circumferential sectors thereof; said sealing means being provided by arcuate seal members that are seated against the action of pre-stressed spring means, in suitable seatings recessed, at equidistantly spaced circumferential sectors, into said inner circumferences of said stator segments; each of said arcuate seal members having a thoroughfare opening whereby a free flow of high pressure combustion gases from the discharge outlets of the combustion chambers towards the rotor and into the expansion channels is allowed for at intervals when the inlets of said expansion channels along the outer circumferences of the rotor segments are facing said discharge outlets along the inner circumferences of the stator segments.

6. The internal combustion rotary engine as claimed in claim 2, wherein said rotary engine has a stator and a rotor consisting respectively, of a plurality of identically shaped stator segments and identically shaped rotor segments, said segments being aligned co-axially along said main shaft, each of said stator segments comprising a segment body a side face of which is sealingly covered by a segment lid, said segment body being provided with two combustion chambers spaced equidistantly around a pre-determined circumference, a discharge outlet and at least one fuel inlet, together with seatings capable of housing an arcuate seal member, and a spark plug bore for each of said combustion chambers, while each rotor segment consists of a ring segment and a cover disk, said cover disk being in diameter equal with and mounted onto one side face of said ring segment, and said ring segment comprising, associated with each combustion chamber, a group of three successive expansion channels.

7. The internal combustion rotary engine as claimed in claim 1, wherein each rotor segment consists of a ring segment and a cover disk, said cover disk being in diameter equal with and mounted onto one side face of said ring segment, said expansion channels being channels of narrowing cross-section recessed into said side face of said ring segment and having, when viewed in the direction of rotation, forward and rearward wall sections confining said channels, and at least said forward wall sections of said expansion channels being shaped, starting from their inlets along the outer circumference of the rotor, as turbine blade-like arcuate wall sections.

8. The internal combustion rotary engine as claimed in claim 1, wherein each rotor segment consists of a ring segment having a side face provided with an axially protruding annular rim at its outer circumference, and a cover disk, said cover disk being in diameter equal with and mounted onto said side face of said ring segment, and said expansion channels being thoroughfare channels arranged in said ring segment, the expansion channels starting, when viewed in the direction of rotation, in tangentially forward direction from their inlets along the outer circumference of said ring segment, curving both, rearwardly and in sideward direction, and opening into said rimmed side face of the ring segment, from where said expansion channels are in direct connection with said inside of the rotor.

9. The internal combustion rotary engine as claimed in claim 1, wherein said engine has heat-insulated, heat-resistant ceramic-lined combustion chambers, discharge outlets and expansion channels, and said rotor segments of said rotor are, at least along their outer circumferences, similarly heat-resistant and heat-insulating ceramic-lined component parts of the engine.

10. The internal combustion rotary engine as claimed in claim 1, wherein said stator of the engine comprising at least two stator segments, the inner circumferences of which are in circumferential sectors where the discharge outlets of said combustion chambers open tangentially into said circumference towards the rotor, provided with sealing means for a sealed but still rotatable engagement between said stator segments and said rotor in said circumferential sectors thereof; said sealing means being provided by arcuate seal members that are seated against the action of pre-stressed spring means, in suitable seatings recessed, at equidistantly spaced circumferential sectors, into said inner circumferences of said stator segments; each of said arcuate seal members having a thoroughfare opening whereby a free flow of high pressure combustion gases from the discharge outlets of the combustion chambers towards the rotor and into the expansion channels is allowed for at intervals when the inlets of said expansion channels along the outer circumferences of the rotor segments are facing said discharge outlets along the inner circumferences of the stator segments.

11. The internal combustion rotary engine as claimed in claim 6, wherein said arcuate seal members are designed and shaped as interchangeable wear parts made of a suitable carbon-based material, each of said arcuate seal members being provided with at least two seal ribs of circular segment-shaped cross-section protruding both sides of the opening along parallel lines from the arcuate inner circumference of said seal member, said seal ribs matching with and thus, forming gas-tight seals against annular sliding and sealing surfaces along the preferably ceramic-lined outer circumference of said at least one rotor segment.

12. The internal combustion rotary engine as claimed in claim 1, wherein said rotary engine has a stator and a rotor consisting respectively, of a plurality of identically shaped stator segments and identically shaped rotor segments, said segments being aligned co-axially along said main shaft, each of said stator segments comprising a segment body a side face of which is sealingly covered by a segment lid, said segment body being provided with two combustion chambers spaced equidistantly around a pre-determined circumference, a discharge outlet and at least one fuel inlet, together with seatings capable of housing an arcuate seal member, and a spark plug bore for each of said combustion chambers, while each rotor segment consists of a ring segment and a cover disk, said cover disk being in diameter equal with and mounted onto one side face of said ring segment, and said ring segment comprising, associated with each combustion chamber, a croup of three successive expansion channels.

13. The internal combustion rotary engine as claimed in claim 12, wherein said identically shaped rotor segments or pre-determined groups of said rotor segments are aligned co-axially along said main shaft in a manner so that the expansion channels, or groups of such expansion channels in said rotor segments are arranged in equidistantly phase-shifted relation to those of the juxtaposed rotor segments around said main shaft.

14. The internal combustion rotary engine as claimed in claim 1, wherein at least some spokes of the rotor are designed and shaped so as to serve, in operation, as axial fan blades for generating and maintaining a space of lower pressure in, and an axial flow of flushing and cooling ambient air through the inside of said rotor.

15. A method of operating the internal combustion rotary engine as claimed in claim 14, the method consisting of injecting intermittently, in amounts depending on the prevailing actual engine performance requirements, and at pre-determined sequential intervals controlled at least in accordance with the number of groups of expansion channels in and their spaced relationship along the circumference, and the actual speed of revolution of the rotor, oxygen or air and fuel that would form a fuel mixture capable of complete combustion in said combustion chambers; causing said fuel mixture, by controlled ignition or spontaneously to combust by detonation at constant volume by keeping said combustion chambers gas-tightly sealed until the peak combustion pressure therein is reached; expanding the high pressure combustion gases, preferably in more than one expansion steps in sequence, in the form of impulses of gas jets directed tangentially, via the discharge outlets of the combustion chambers into said expansion channels by bringing, through the rotation of said rotor relative to the stator, the circumferential inlet openings of said expansion channels in temporary facing relationship with said discharge outlets of said combustion chambers; and by removing the expanded combustion gases from said expansion channels through the hollow inside of the rotor.

16. A method of operating the internal combustion rotary engine as claimed in claim 1, the method consisting of injecting intermittently, in amounts depending on the prevailing actual engine performance requirements, and at pre-determined sequential intervals controlled at least in accordance with the number of groups of expansion channels in and their spaced relationship along the circumference, and the actual speed of revolution of the rotor, oxygen or air and fuel that would form a fuel mixture capable of complete combustion in said combustion chambers; causing said fuel mixture, by controlled ignition or spontaneously to combust by detonation at constant volume by keeping said combustion chambers gas-tightly sealed until the peak combustion pressure therein is reached; expanding the high pressure combustion gases in the form of impulses of gas jets directed tangentially, via the discharge outlets of the combustion chambers into said expansion channels by bringing, through the rotation of said rotor relative to the stator, the circumferential inlet openings of said expansion channels in temporary facing relationship with said discharge outlets of said combustion chambers; and by removing the expanded combustion gases from said expansion channels through the hollow inside of the rotor.

17. The method as claimed in claim 16, wherein the fuel mixture capable of complete combustion is produced by injecting, by means of an electronic fuel injection device, high pressure air and liquid fuel in sequence into said combustion chambers.

18. The method as claimed in claim 16, wherein the fuel mixture capable of complete combustion by detonation in the combustion chambers is produced by injecting, by means of an electronic fuel injection device, oxygen and hydrogen into said combustion chambers.

19. The method as claimed in claim 16, wherein pre-determined additional amounts of water are infected into said combustion chambers at times when combustion of the fuel mixture in said combustion chambers has been completed.

20. The method as claimed in claim 16, wherein especially in partial load and no-load run modes of operation, the injecting of fuel and optionally, of air or oxygen into at least some of the combustion chambers is suspended, and sequentially controlled switch-overs between working and temporarily suspended combustion chambers, preferably by segments, are performed so as to provide a substantially equal distribution of thermal load and wear over said combustion chambers of the engine.

* * * * *

UNITED STATES PATENT AND TRADEMARK OFFICE
CERTIFICATE OF CORRECTION

PATENT NO. : 6,035,630
DATED : March 14, 2000
INVENTOR(S) : Sandor Soos

It is certified that error appears in the above-identified patent and that said Letters Patent is hereby corrected as shown below:

In the Abstract:
Line 20, change "temporally" to --temporarily--.

COLUMN 1:
Line 35, change "Zeftner" to --Zettner--.
Line 62, change "gasewould" to --gases would--.

COLUMN 2:
Line 56, change "temporally" to --temporarily--.

COLUMN 6:
Line 3, after "lines" insert --on--.

COLUMN 7:
Line 19, change "during" to --while--.
Line 23, after "truding" insert --from--.
Line 25, change "is engages to --is engaged--.
Line 59, change "rests of" to --remaining--.
Line 64, change "temporary" to --temporarily--.
Line 65, after "prior" insert --to--.

COLUMN 8:
Line 4, change "break" to --brake-- (two occurrences).
Line 7, change "injecting" to --injection of--.

COLUMN 9:
Line 1, change "loose" to --lose--.
Line 59, change "spontaneous combustion" to --spontaneously combust--.

UNITED STATES PATENT AND TRADEMARK OFFICE
CERTIFICATE OF CORRECTION

PATENT NO. : 6,035,630
DATED : March 14, 2000
INVENTOR(S) : Sandor Soos

It is certified that error appears in the above-identified patent and that said Letters Patent is hereby corrected as shown below:

COLUMN 10:
Line 52, change "wall the portions" to --the wall portions--.

COLUMN 12:
Line 8, change "break" to --braking--.
Line 22, change "temporary" to --temporarily--.
Line 26, change "5 to 6" to --5 to 6 cm$^3$--.

Column 16:
Line 37, change "croup" to --group--.
Line 15, after "protruding" insert --from--.
Line 37, change "croup" to --group--.

Column 18:
Line 15, change "infected" to --injected--.
Line 15, change "infected" to --injected--.

Signed and Sealed this

Twelfth Day of June, 2001

*Attest:*

NICHOLAS P. GODICI
*Attesting Officer*     *Acting Director of the United States Patent and Trademark Office*